(12) United States Patent
Okuwaki

(10) Patent No.: US 7,014,347 B2
(45) Date of Patent: Mar. 21, 2006

(54) ILLUMINATION DEVICE FOR A COLOR LIQUID CRYSTAL DISPLAY

(75) Inventor: Daisaku Okuwaki, Yamanashi-ken (JP)

(73) Assignee: Citizen Electronics Co., Ltd., Yamanashi-ken (JP)

(*) Notice: Subject to any disclaimer, the term of this patent is extended or adjusted under 35 U.S.C. 154(b) by 183 days.

(21) Appl. No.: 10/377,873

(22) Filed: Mar. 4, 2003

(65) Prior Publication Data

US 2003/0169585 A1 Sep. 11, 2003

(30) Foreign Application Priority Data

Mar. 5, 2002 (JP) .................. 2002-059051

(51) Int. Cl.
*F21V 8/00* (2006.01)

(52) U.S. Cl. .......................... 362/555; 362/27; 362/561
(58) Field of Classification Search .................. 362/27, 362/555, 558, 561, 800; 349/117
See application file for complete search history.

(56) References Cited

U.S. PATENT DOCUMENTS

| | | | | | |
|---|---|---|---|---|---|
| 5,828,471 | A | * | 10/1998 | Davis et al. | 359/15 |
| 5,982,092 | A | * | 11/1999 | Chen | 313/512 |
| 6,007,209 | A | * | 12/1999 | Pelka | 362/30 |
| 6,196,691 | B1 | * | 3/2001 | Ochiai | 362/31 |
| 6,608,614 | B1 | * | 8/2003 | Johnson | 345/102 |
| 2003/0012035 | A1 | * | 1/2003 | Bernard | 362/555 |
| 2003/0048628 | A1 | * | 3/2003 | Lee et al. | 362/27 |
| 2003/0156080 | A1 | * | 8/2003 | Koike et al. | 345/60 |

* cited by examiner

*Primary Examiner*—Y. My Quach-Lee
*Assistant Examiner*—Peggy A. Neils
(74) *Attorney, Agent, or Firm*—Dennison, Schultz, Dougherty & MacDonald

(57) ABSTRACT

An illuminating device has an LED, a lighting panel provided corresponding to the LED for guiding light emitted from the LED to illuminate an LCD. An optical membrane is provided on a surface through which the light from the LED passes so as to correct chromaticity of the light.

9 Claims, 8 Drawing Sheets

ILLUMINATION DEVICE FOR A COLOR LIQUID CRYSTAL DISPLAY

BACKGROUND OF THE INVENTION

The present invention relates to an illumination device for illuminating a color liquid crystal display (LCD) as a front light.

An illumination device for the color LCD comprises a white LED and an illumination panel for illuminating the color LCD disposed below the illumination panel. In order to illuminate the LCD so that the LCD displays images with natural tone, it is necessary to balance the chromaticity of the white LED, the transmittance of the crystal in the LCD at every color, and the characteristic of a color filter provided in the LCD.

However, since it is difficult to adjust the transmittance of the crystal at every color, the chromaticity of the LED is adjusted.

FIG. 8 is a sectional view of a white LED. The white LED 50 comprises a substrate 51, a blue LED element 52 on the substrate 51 and a YAG fluorescent layer 53 covering the LED element 52. Blue light from the LED element 52 excites the YAG fluorescent layer to cause it to emit light yellow light. The blue light and light yellow light are mixed to produce white light.

FIGS. 9 through 13 are graphs showing spectrums of the light emitted from the white LED 50. The horizontal axis is the wave length (nm), the vertical axis is the relative intensity of the spectrum. In the graph, the red light has a wave length of about 625 nm, green light has a wave length of about 560 nm, and blue light has a wave length of about 450 nm.

FIG. 9 shows a spectrum H1 of normal white light emitted from the LED 50. The spectrums E2 and H3 of FIGS. 10 and 11 show lights of slightly blue, and H4 and H5 of FIGS. 12 and 13 show lights of slightly yellow.

FIG. 14 is a CIE chromaticity diagram showing the proportion of the chromaticity of the light emitted from the white LED. The X-axis shows the proportion of red, Y-axis shows the proportion of green and Z-axis shows the proportion of blue. There is a relationship of X+Y+Z=1. The point CO at a central position is a point of the proportion of chromaticity of 1:1:1. The coordinate of the point CO is X=0.33, Y=0.33 and Z=0.33. An area S surrounded by a dotted line is regarded as a white color range.

In order to provide a color LCD having a natural tone, it is necessary to provide LEDs with various chromaticities. However, the preparation of various LEDs increases the manufacturing cost.

SUMMARY OF THE INVENTION

An object of the present invention is to provide an illumination device which is not necessary to prepare various LEDs.

According to the present invention, there is provided an illuminating device comprising an LED, a lighting panel provided corresponding to the LED for guiding light emitted from the LED to illuminate an LCD, and an optical membrane provided on a surface through which the light from the LED passes so as to correct chromaticity of the light.

The device further comprises a light guide rod provided between the LED and the lighting panel so as to guide the light from the LED to the lighting panel.

The lighting panel is disposed above the LCD.

These and other objects and features of the present invention will become more apparent from the following detailed description with reference to the accompanying drawings.

DETAILED DESCRIPTION OF THE PREFERRED EMBODIMENT

Figure 1:
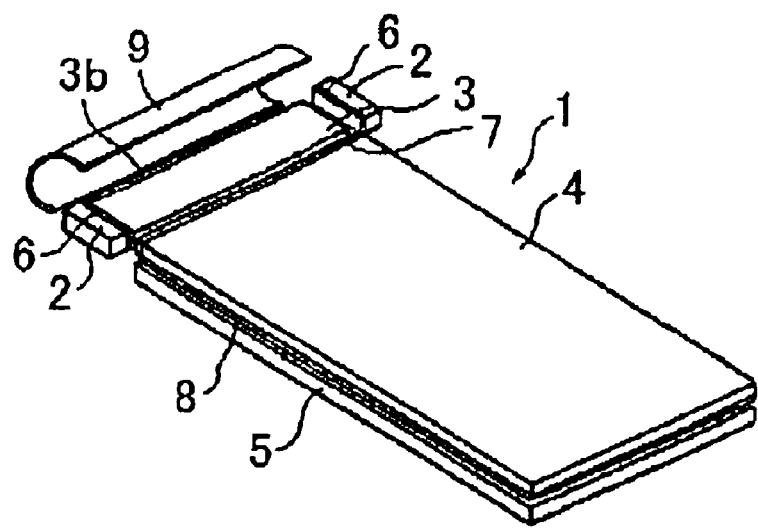
FIG. 1 is a perspective view showing an illumination device according to a first embodiment of the present invention.

Referring to FIG. 1, an illumination device 1 comprises a light guide rod 3 made of a transparent resin, a pair of white LEDs 2 disposed at both ends of the light guide rod 3, an illuminating panel 4 made of a transparent resin disposed above a color LCD 5 as a front light and a reflector 9 disposed behind the light guide rod 3.

Figure 2:
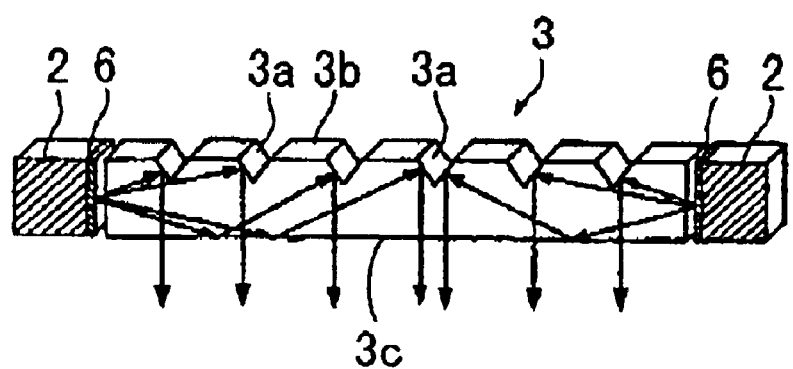
FIG. 2 is a perspective view of a light guide rod.

As shown in FIG. 2, the white LED 2 is disposed corresponding to an incident end surface. The guide rod 3 has a reflection surface 3b and a discharge surface 3c. A plurality of prisms 3a, each having a V-shaped groove are formed in the reflection surface 3b.

Figure 3:
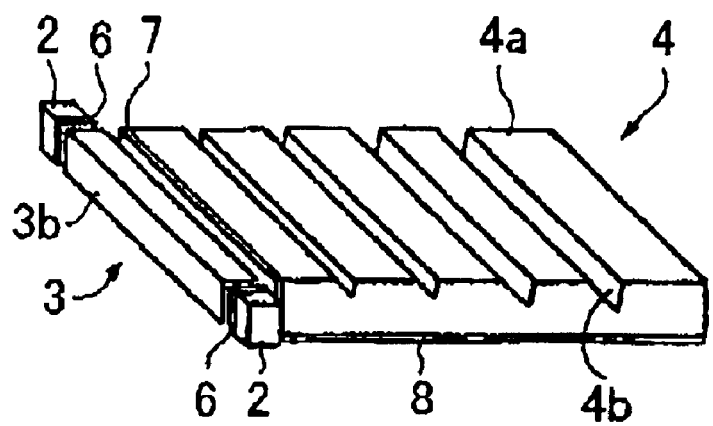
FIG. 3 is a perspective view of a lighting panel.
Figure 4:
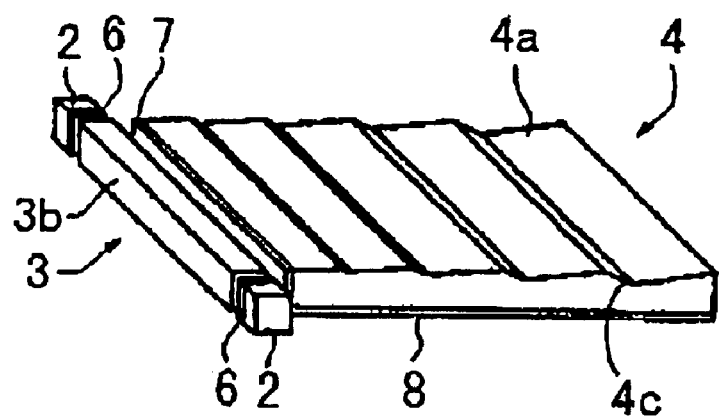
FIG. 4 is a perspective view of another lighting panel.

Referring to FIG. 3, the illuminating panel 4 has an incident surface corresponding to the discharge surface 3c of the light guide rod 3, a reflection surface 4a, a discharge surface. There is provided a plurality of prisms 4b, each having a V-shaped groove in the reflection surface 4a. In the illuminating panel 4 of FIG. 4, a plurality of prisms 4c, each having a step-like groove, are formed.

In accordance with the present invention, there is provided an optical membrane 6, 7 or 8 on at least one of transmitting incident and discharge surfaces of the guide rod 3 and the illuminating panel 4 for transmitting or reflecting light of a predetermined wave length range by membranes as an interference film, thereby correcting the chromaticity of the light passing the surface. In the embodiment, the optical membrane 6 is employed in the following description.

The optical membrane comprises, for example, a plurality of membranes which are different from each other in refractive index. The thickness of the membrane and the number of the membrane are selected so as to provide desired white light.

Figure 5:
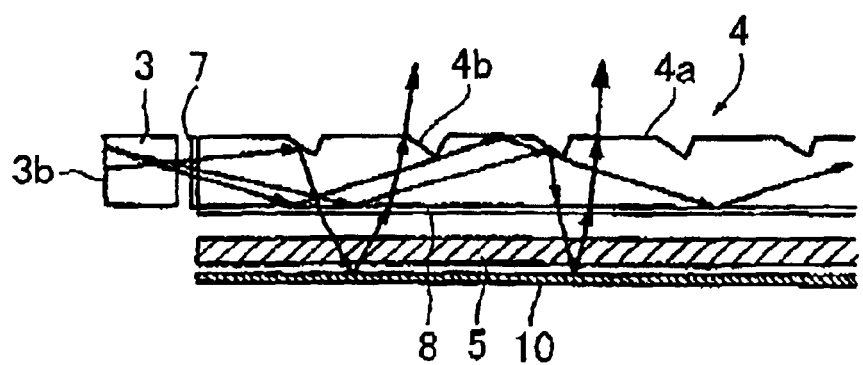
FIG. 5 is a side view of the illumination device using the lighting panel of FIG. 3.
Figure 6:
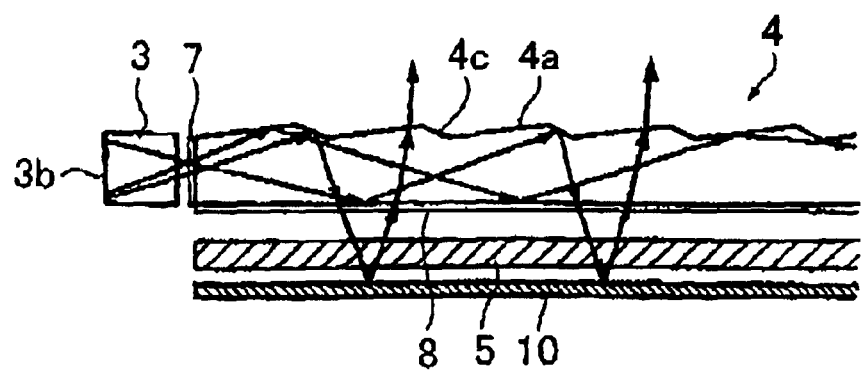
FIG. 6 is a side view of the illumination device using the lighting panel of FIG. 5.

The lights emitted from the LEDs 2 enter the light guide rod 3 from the incident surfaces through the optical membrane 6. The color of the light emitted from the LEDs is corrected to proper white by the optical membrane. As shown in FIG. 2, the light in the light guide rod 3 is reflected by the prisms 3a and discharged from the discharge surface 3c as a plurality of bright lines. If the distance between adjacent prisms is sufficiently reduced, the bright lines approach each other, so that the whole discharge surface 3c brightens as a single surface. The discharged light enters in the lighting panel 4 from the incident surface as shown in FIG. 5 or 6. The light in lighting panel 4 is reflected by the prisms 4b or 4c and discharged from the discharge surface.

The light from the lighting panel 4 transmits the color LCD 5 and is reflected by a reflector 10. The reflected light transmits the color LCD 5 again, and transmits the lighting panel 4.

Figure 7:
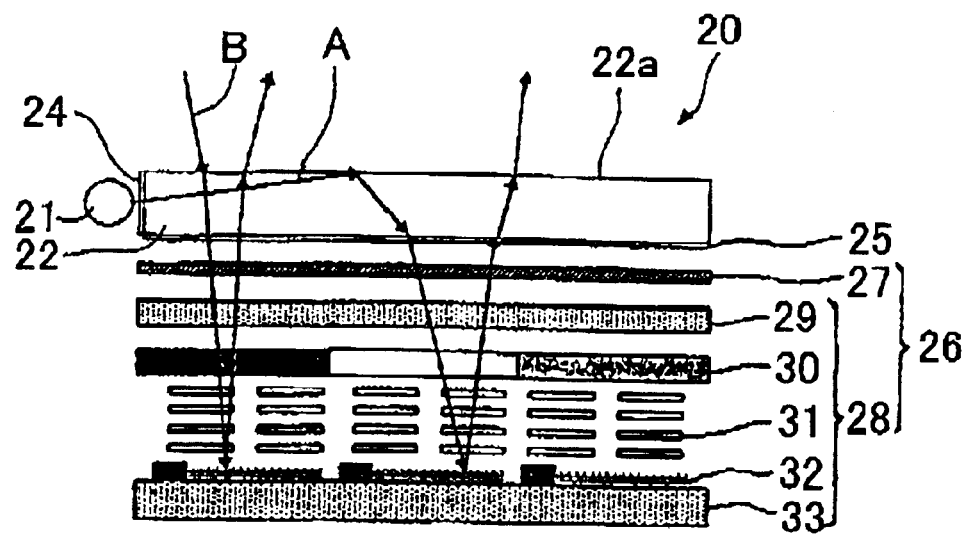
FIG. 7 is a side view showing a second embodiment of the present invention.
Figure 8:
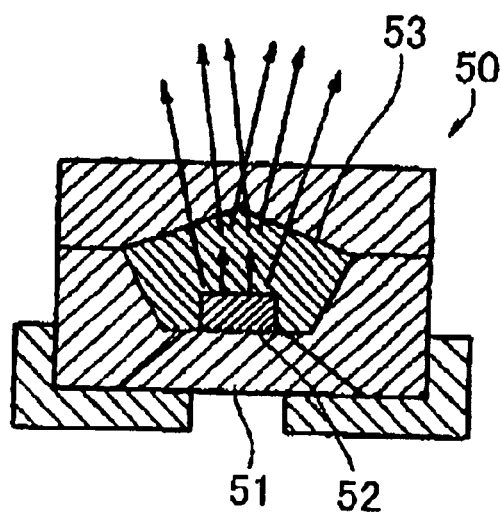
FIG. 8 is a sectional view of a white LED.
Figure 9:
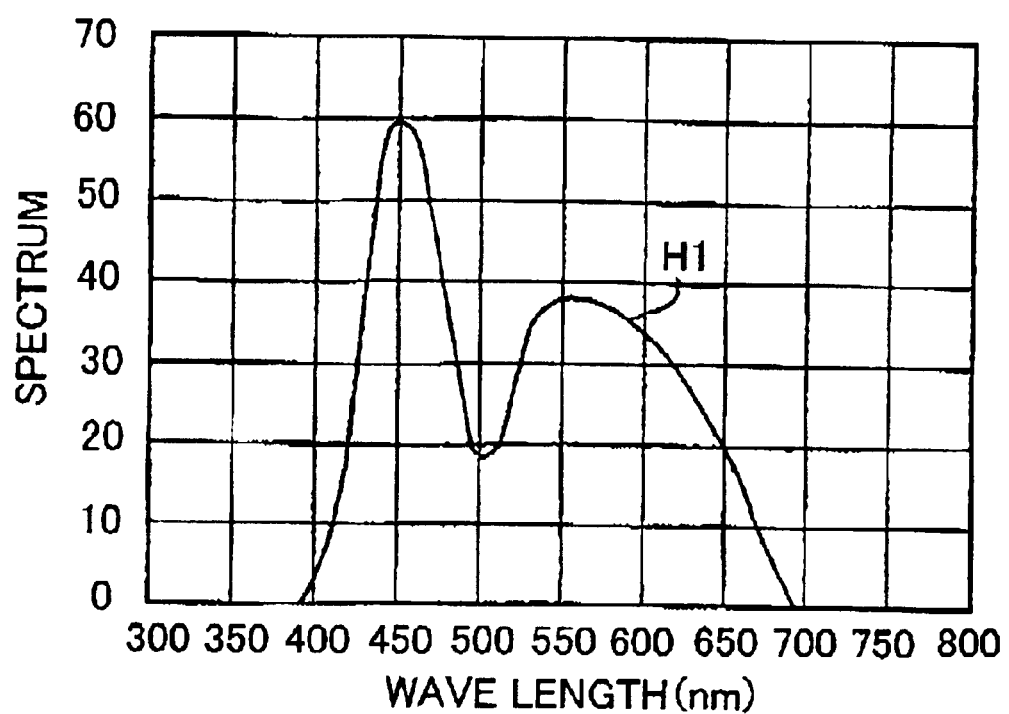
FIGS. 9 through 13 are graphs showing spectrums of the light emitted from the white LED.
Figure 10:
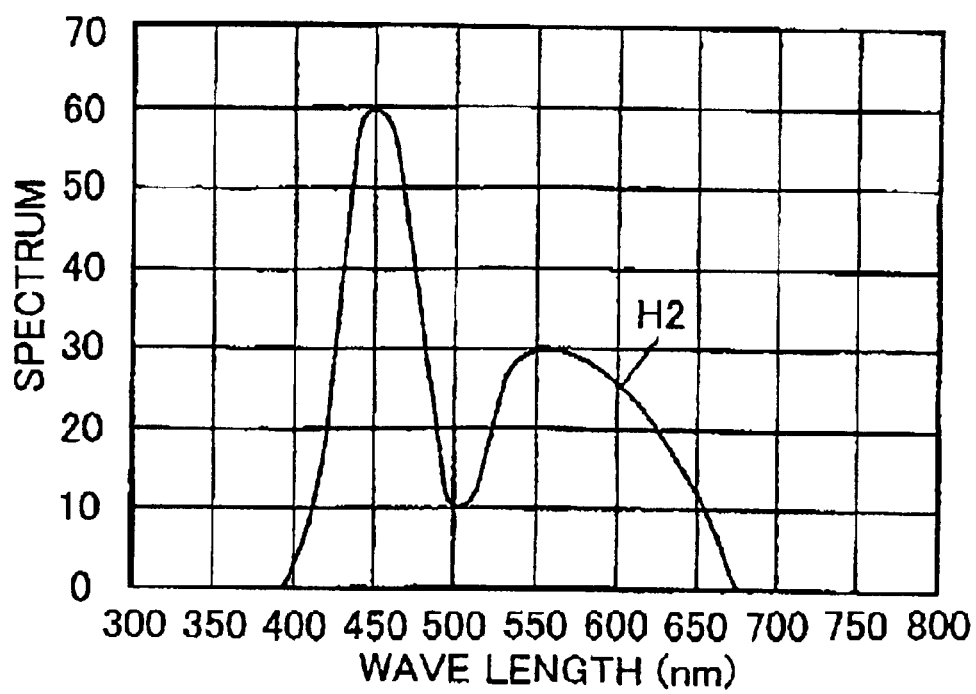
Figure 11:
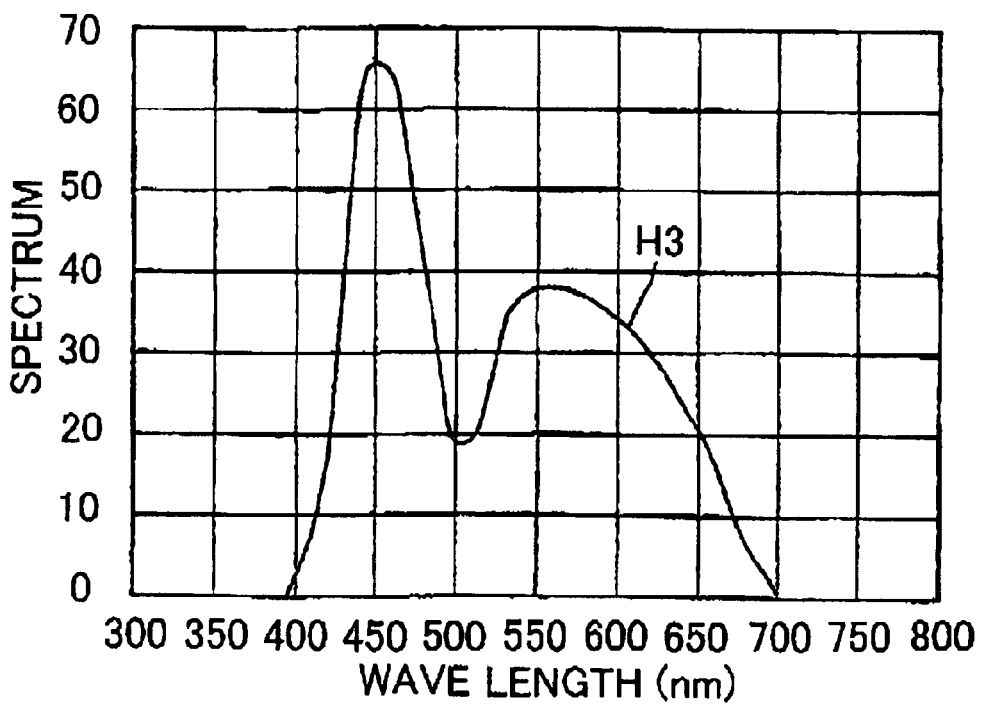
Figure 12:
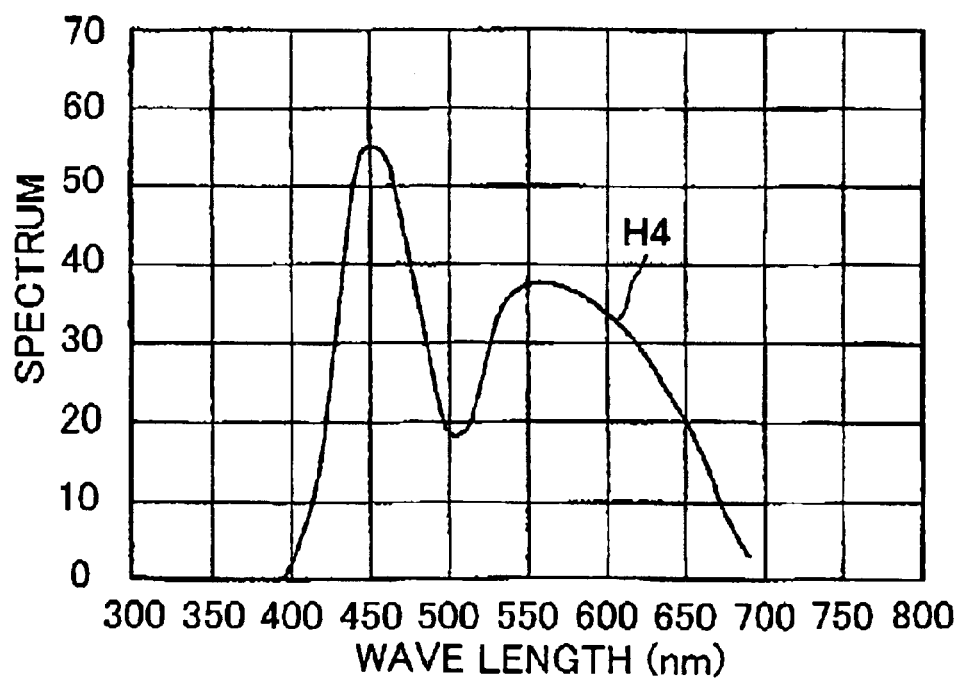
Figure 13:
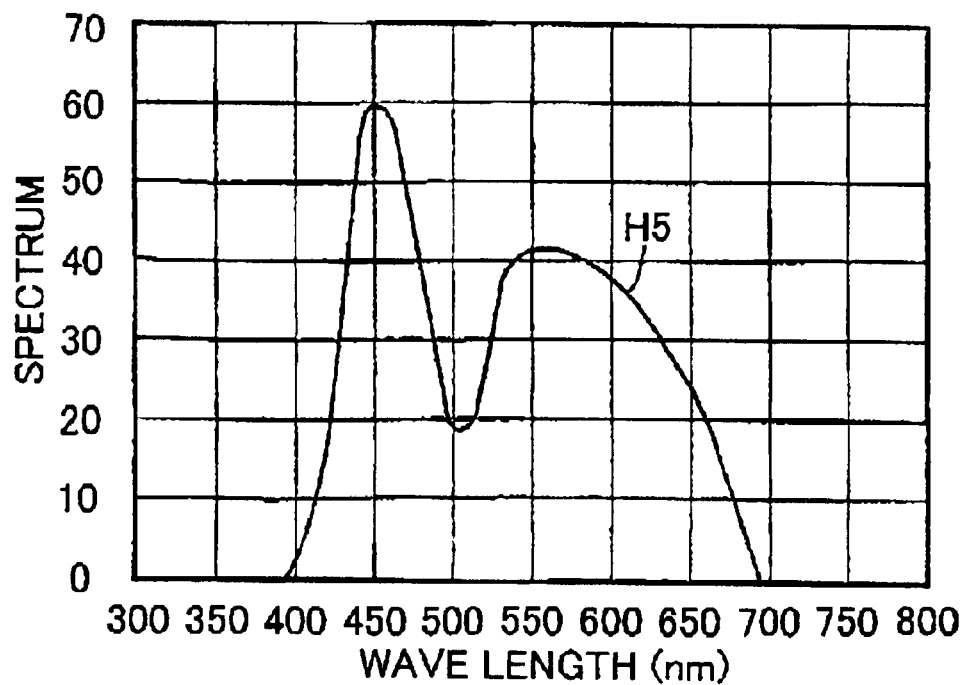
Figure 14:
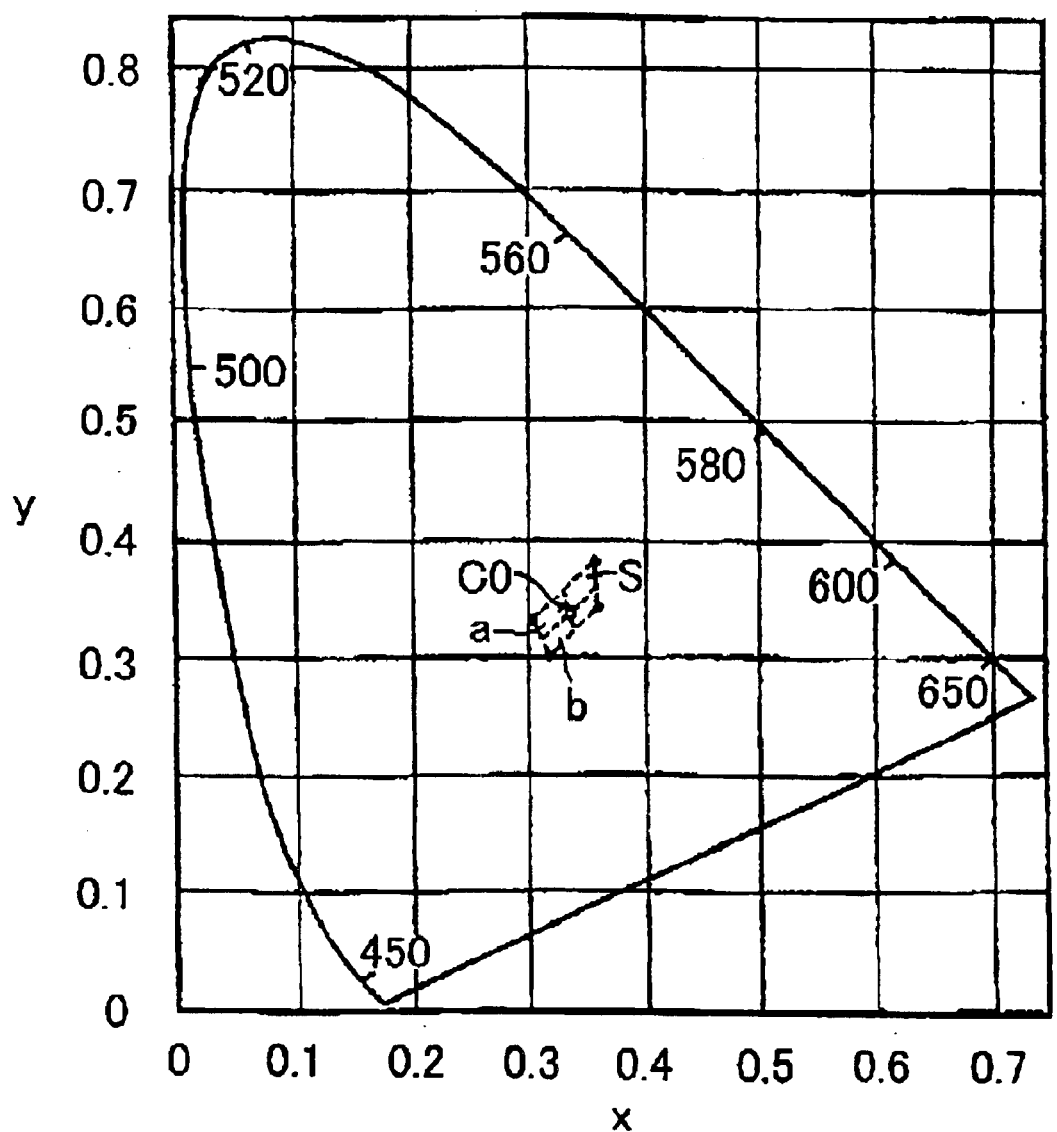
FIG. 14 is a CIE chromaticity diagram showing the proportion of the chromaticity of the light emitted from the white LED.

Referring to FIG. 7 showing the second embodiment of the present invention, an illumination device 20 comprises a white LED 21, a lighting panel 22, and a color LCD 26. The lighting panel 22 is made of transparent resin and has an incident surface, a reflection surface 22a having a plurality of prisms (not shown), and a discharge surface. An optical membranes 24 and 25 are provided on the incident surface and discharge surface. There is no light guide 3 provided as in the first embodiment. The color LCD 26 comprises a polarization plate 27 and a liquid crystal cell 28. The cell 28 comprises an upper glass substrate 29, a color filter 30, a liquid crystal 31, a reflection plate 32, and a lower glass substrate 33.

The lights emitted from the LED 21 enter the lighting panel 22 from the incident surface through the optical membrane 24. The light A in lighting panel 22 is reflected by the prisms on the reflection surface 22a and discharged from the discharge surface, passing through the optical membrane 25 on the discharge surface. Thus, the color of the light emitted from the LED 21 is corrected to proper white by the optical membranes.

The light from the lighting panel 22 transmits the color LCD 26 and is reflected by the reflection plate 32. The reflected light transmits the color LCD 26 again, and transmits the lighting panel 22.

When the luminous intensity of atmospheric light B is high, the white LED 21 is not used.

When the color tone of the LCD 5 or 26 changes by change of transmittance characteristics of the LCD, it is possible to correct the changes by forming membranes on the light receiving or the light discharging surface of the illuminating panels 4 or 22. Also, it is possible to correct the changes by forming the membranes or the light discharging surface of the light guide rod 3.

In accordance with the present invention, the chromaticity of the light emitted from the LED is corrected by the optical membrane to desired white, so that the color LCD may display a natural image.

While the invention has been described in conjunction with preferred specific embodiment thereof, it will be understood that this description is intended to illustrate and not limit the scope of the invention, which is defined by the following claims.

What is claimed is:

1. An illuminating device comprising:

an LED;

a lighting panel provided corresponding to the LED for guiding light emitted from the LED to illuminate an LCD; and an optical interference film comprising at least one membrane provided on a surface through which the light from the LED passes, the optical membrane being different in refractive index so as to correct chromaticity of the light.

2. The device according to claim 1 further comprising a light guide rod provided between the LED and the lighting panel so as to guide the light from the LED to the lighting panel.

3. The device according to claim 1 wherein the lighting panel is disposed above the LCD.

4. The device according to claim 1 wherein the membrane is provided on a surface of the light guide rod, the surface is opposite to the light emitting surface of the LED.

5. The device according to claim 2 wherein the membrane is provided on a surface of the light guide rod, the surface is opposite to the light receiving surface of the lighting panel.

6. The device according to claim 2 wherein the membrane is provided on a surface of the light panel, the surface is the light receiving surface of the lighting panel and opposite to the light emitting surface of the LED.

7. The device according to claim 2 wherein the membrane is provided on a surface of the lighting panel, the surface is the light receiving surface of the lighting panel and opposite to the light emitting surface of the LED through the light guide rod.

8. The device according to claim 1 wherein the membrane is provided on a light discharge surface of the lighting panel.

9. The device according to claim 2 wherein the membrane is provided on a light discharge surface of the lighting panel.

* * * * *

UNITED STATES PATENT AND TRADEMARK OFFICE
CERTIFICATE OF CORRECTION

| | | |
|---|---|---|
| PATENT NO. | : 7,014,347 B2 | |
| APPLICATION NO. | : 10/377873 | |
| DATED | : March 21, 2006 | |
| INVENTOR(S) | : Daisaku Okuwaki | |

It is certified that error appears in the above-identified patent and that said Letters Patent is hereby corrected as shown below:

Please amend claim 6 as follows:

Column 4, claim 6, line 2 of the claim, "light" should read --lighting--.

Signed and Sealed this

Third Day of April, 2007

JON W. DUDAS
*Director of the United States Patent and Trademark Office*